US012305425B2

(12) United States Patent
Olkay et al.

(10) Patent No.: US 12,305,425 B2
(45) Date of Patent: May 20, 2025

(54) SWIVEL LEVER DEVICE AND SYSTEM FOR ACTUATING A CLOSURE APPARATUS OF AN ACCESS CONTROL DEVICE

(71) Applicant: DIRAK Dieter Ramsauer Konstruktionselemente GmbH, Ennepetal (DE)

(72) Inventors: Cem Olkay, Witten (DE); Peter Hoschler, Velbert (DE)

(73) Assignee: DIRAK Dieter Ramsauer Konstruktionselemente GmbH, Ennepetal (DE)

(*) Notice: Subject to any disclaimer, the term of this patent is extended or adjusted under 35 U.S.C. 154(b) by 156 days.

(21) Appl. No.: 17/914,471

(22) PCT Filed: Mar. 8, 2021

(86) PCT No.: PCT/EP2021/055719
§ 371 (c)(1),
(2) Date: Sep. 26, 2022

(87) PCT Pub. No.: WO2021/190908
PCT Pub. Date: Sep. 30, 2021

(65) Prior Publication Data

US 2023/0160233 A1 May 25, 2023

(30) Foreign Application Priority Data

Mar. 27, 2020 (DE) ..................... 10 2020 108 484.6

(51) Int. Cl.
*E05B 47/00* (2006.01)
*E05B 13/10* (2006.01)
(Continued)

(52) U.S. Cl.
CPC ........ *E05B 47/0045* (2013.01); *E05B 13/106* (2013.01); *E05B 35/14* (2013.01); *E05C 3/042* (2013.01)

(58) Field of Classification Search
CPC .... E05B 47/00; E05B 47/0045; E05B 13/106; E05B 35/14; E05C 3/042; Y10T 70/7057
(Continued)

(56) References Cited

U.S. PATENT DOCUMENTS 6,053,018 A * 4/2000 Ramsauer ............... E05B 17/22 109/44
7,040,125 B2 * 5/2006 Ciezki ................ G07C 9/00944 292/DIG. 31
(Continued)

FOREIGN PATENT DOCUMENTS

DE 8704430 U1 10/1987
DE 3701440 A1 7/1988
(Continued)

*Primary Examiner* — Suzanne L Barrett
(74) *Attorney, Agent, or Firm* — The Webb Law Firm

(57) ABSTRACT

The invention relates to a swivel lever device for actuating a closure apparatus, in particular a bolt-closure means and/or bar-closure means, of an access control device, in particular a door and/or hatch, having: a housing for fastening the swivel lever device, in particular to the access control device, and a swivel lever for actuating the closure apparatus, the swivel lever be movable relative to the housing between an arresting position and an actuation position for actuating the closure apparatus, the swivel lever in the actuation position being pivotable about an actuation axis relative to the housing, a locking mechanism for securing the swivel lever against unauthorised movement from the arresting position into the actuation position being provided, and the locking mechanism comprising at least one locking element, which can be moved between a locked position for interlockingly blocking the movement of the swivel lever
(Continued)

from the arresting position to the actuation position and an unlocked position for releasing the movement of the swivel lever from the arresting position into the actuation position. To achieve better protection against damage and contamination, according to the invention the locking element includes at least one locking magnet for moving the locking element from the locked position into the unlocked position by means of the magnetic interaction between the locking magnet and at least one unlocking magnet of a corresponding key unit.

16 Claims, 10 Drawing Sheets

(51) Int. Cl.
*E05B 35/14* (2006.01)
*E05C 3/04* (2006.01)

(58) Field of Classification Search
USPC .............................................................. 70/276
See application file for complete search history.

(56) References Cited

U.S. PATENT DOCUMENTS

| | | | | |
|---|---|---|---|---|
| 7,089,770 | B2 * | 8/2006 | Ramsauer | E05B 17/22 292/DIG. 31 |
| 7,681,424 | B2 * | 3/2010 | Antonucci | E05B 47/0657 70/279.1 |
| 8,801,054 | B2 * | 8/2014 | Ligtenberg | H05K 5/0221 292/177 |
| 11,085,208 | B1 * | 8/2021 | Walterscheid | E05B 67/383 |
| 2003/0141724 | A1 * | 7/2003 | Ramsauer | E05B 47/0657 292/348 |

FOREIGN PATENT DOCUMENTS

| | | | | |
|---|---|---|---|---|
| DE | 202011004951 U1 | | 3/2013 | |
| EP | 1774125 B1 | * | 6/2009 | E05B 81/78 |
| GB | 2389141 A | | 12/2003 | |
| JP | 6901795 B2 | * | 7/2021 | A45C 13/1069 |
| WO | 9740248 A | | 10/1997 | |

* cited by examiner

SWIVEL LEVER DEVICE AND SYSTEM FOR ACTUATING A CLOSURE APPARATUS OF AN ACCESS CONTROL DEVICE

CROSS-REFERENCE TO RELATED APPLICATIONS

This application is the United States national phase of International Application No. PCT/EP2021/055719 filed Mar. 8, 2021, and claims priority to German Patent Application No. 10 2020 108 484.6 filed Mar. 27, 2020, the disclosures of which are hereby incorporated by reference in their entirety.

BACKGROUND OF THE INVENTION

Field of the Invention

The invention relates to a swivel lever device for actuating a closure apparatus, in particular a bolt closure means and/or bar closure means, of an access control device, in particular of a door and/or hatch, having a housing for fastening the swivel lever device, in particular to the access control device, and a swivel lever for actuating the closure apparatus, wherein the swivel lever can be adjusted relative to the housing between a latched position and an actuating position for actuating the closure apparatus, wherein the swivel lever can be pivoted in the actuating position about an actuating axis relative to the housing, wherein a locking mechanism for securing the swivel lever against being adjusted unauthorised from the latched position to the actuating position is provided, and wherein the locking mechanism comprises at least one locking element which can be adjusted between a locking position for positively blocking the swivel lever being adjusted from the latched position to the actuating position and an unlocking position for releasing the swivel lever for being adjusted from the latched position to the actuating position.

Description of Related Art

The invention also relates to a system for actuating a closure apparatus, in particular a bolt closure means and/or bar closure means, of an access control device, in particular of a door and/or hatch, having a swivel lever device and a corresponding key unit.

Access control devices which can be used to close and release entrances, such as doors or hatches, are known in different configurations. Access control devices, regardless of their configuration, often have a closure apparatus. They prevent the access control device from unintentionally moving from a position closing the corresponding entrance to a position releasing the entrance and/or being adjusted accordingly by unauthorised persons.

Closure apparatuses are, for example, bolt closure means. They usually have a bolt which can be adjusted between a position for positively blocking the opening of the access control device and a position for releasing the opening of the access control device. In this case, bolt closure means, in which the bolt is adjusted by swivelling or turning the bolt, are often also referred to as rotary bolt closure means. In addition to bolt closure means, bar closure means are also known as closure apparatuses, which, unlike bolt closure means, generally have one or a plurality of bar elements. In this case, the at least one bar element enables the access control device to be fixed at two or more points, in particular points opposite one another. This can increase the security against the access control device being opened unauthorised.

Irrespective of the configuration of the closure apparatus, swivel lever devices are often used to actuate the closure apparatus. Swivel lever devices usually comprise a housing by means of which the swivel lever device can be fastened to the access control device. In addition to the housing, swivel lever devices generally comprise a swivel lever in accordance with their designation. This is used for the actual actuation of the closure apparatus and can be pivoted about an actuating axis in an actuating position. In addition, the swivel lever can usually be adjusted from the actuating position to a latched position and back, wherein the swivel lever can be secured in the latched position so that unauthorised persons cannot adjust the swivel lever from the latched position to the actuating position and thus open the access control device. An advantage of swivel levers is that a swivel lever in the blocking position lies on or in the housing in a flat and space-saving manner.

To secure the swivel lever in the latched position, the swivel lever device often comprises a locking mechanism, for example in the form of a cylinder lock. Irrespective of the specific configuration, the locking mechanism generally comprises at least one locking element, which can be adjusted between a locking position and an unlocking position by means of a corresponding key unit, for example in the form of a bit key. In this case, the locking position serves to block the swivel lever from being adjusted from the latched position to the actuating position in a positive-locking manner, and the unlocking position serves to release the swivel lever for being adjusted from the latched position to the actuating position.

The disadvantage of the swivel lever devices known from the prior art is that they are susceptible to vandalism. This applies in particular to the locking mechanism. Cylinder locks, for example, are regularly stuck together by applying superglue, rendering them inoperable. This and the fact that damage to the locking mechanism often requires the replacement of the entire swivel lever device means that the swivel lever device and with it the key unit must be replaced frequently.

SUMMARY OF THE INVENTION

The object underlying the invention is therefore to design and further develop the swivel lever device mentioned at the outset and previously described in more detail as well as the system mentioned at the outset and previously described in more detail in such manner that the swivel lever device and the system are better protected from damage and soiling and therefore need to be replaced less frequently.

This object is achieved with a swivel lever device according to the preamble of claim 1 in that the locking element comprises at least one locking magnet for adjusting the locking element from the locking position to the unlocking position by means of the magnetic interaction between the locking magnet and at least one unlocking magnet of a corresponding key unit.

The swivel lever device according to the invention is designed to actuate a closure apparatus of an access control device, for example in the form of a door and/or a hatch. The swivel lever device can therefore be designed to adjust the closure apparatus from a position for positively blocking the access control device from being opened to a position for releasing the access control device for being opened and back. Irrespective of this, the closure apparatus can in particular be a bolt closure means and/or a bar closure means.

For fastening purposes, the swivel lever device has a housing. The housing is in particular provided for fastening the swivel lever device to the access control device. However, it is also conceivable, for example, to fasten the swivel lever device by means of the housing to a frame, for example a cabinet, on which the access device is held. Irrespective of this, for the sake of simplicity, the housing can have at least one fastening element, for example in the form of a thread, for fastening the swivel lever device.

Furthermore, the swivel lever device has a swivel lever by means of which the closure apparatus can be actuated. In this case, the swivel lever can be adjusted from a latched position to an actuating position and back. In the actuating position, which serves to actuate the closure apparatus, the swivel lever can be pivoted relative to the housing about an actuating axis. The closure apparatus can therefore be actuated by pivoting the swivel lever in the actuating position about the actuating axis. In this case, the pivoting of the swivel lever in the actuating position and the adjustment of the swivel lever between the latched position and the actuating position can generally take place in directions at least substantially parallel to one another. However, it is preferred if the pivoting of the swivel lever in the actuating position and the adjustment of the swivel lever between the latched position and the actuating position can take place in directions at least substantially perpendicular to one another.

Irrespective of this, it may be expedient if, in the latched position, the pivoting of the swivel lever relative to the housing about the actuating axis is blocked in a positive-locking manner, in particular in two opposing directions. If the swivel lever is in the latched position, actuation of the closure apparatus by means of the swivel lever device is therefore in particular not possible.

With regard to a simple design, it may be advisable if the actuating axis is arranged at least substantially perpendicular to a contact surface of the housing for contact with the access control device. Irrespective of this, it may also be advisable for the sake of simplicity if the adjustment of the swivel lever from the actuating position to the latched position and/or back can take place by pivoting the swivel lever, in particular about an axis at least substantially perpendicular to the actuating axis.

In addition to the housing and the swivel lever, the swivel lever device comprises a locking mechanism. The locking mechanism is designed to secure the swivel lever against being adjusted unauthorised from the latched position to the actuating position. If necessary, it can be ensured that only authorised persons, who have a corresponding key unit, can adjust the swivel lever from the latched position to the actuating position. Irrespective of this, the locking mechanism comprises at least one locking element. In this case, the locking element can be adjusted from a locking position for positively blocking the swivel lever from being adjusted from the latched position to the actuating position to an unlocking position for releasing the swivel lever for being adjusted from the latched position to the actuating position and back. The locking element can therefore block the swivel lever from being adjusted from the latched position to the actuating position in a positive-locking manner in the locking position and release it in the unlocking position.

According to the invention, it is provided that the locking element comprises at least one locking magnet. In this case, this locking magnet is designed to adjust the locking element from the locking position to the unlocking position by means of the magnetic interaction between the locking magnet and at least one unlocking magnet of a corresponding key unit. The locking magnet thus enables the locking element to be adjusted from the locking position to the unlocking position by means of a magnetic force. This has the advantage that the locking mechanism does not have to be accessible from the outside in the latched position of the swivel lever in order to adjust the locking element from the locking position to the unlocking position. Instead, the locking mechanism can be configured such that it is inaccessible from the outside in the latched position of the swivel lever. In this way, the locking mechanism can be better protected against damage from outside by vandalism and thus the service life of the swivel lever device can be extended.

For the sake of simplicity, the at least one locking magnet is in particular a permanent magnet. In this case, a permanent magnet is understood in particular as a magnet which has a constant magnetic field over a longer period of time without an electric voltage having to be applied, as is the case with electromagnets.

According to one configuration of the swivel lever device, the locking mechanism comprises at least two locking elements. In this way, the security against the swivel lever being adjusted unauthorised from the latched position to the actuating position can be increased. This applies all the more if the locking mechanism comprises at least four, preferably at least six, in particular at least eight, locking elements. Irrespective of the number of locking elements, it is expedient if the locking elements can each be adjusted between a locking position and an unlocking position. Alternatively or additionally, it may be advisable with regard to simple functioning of the locking mechanism if the locking elements each comprise at least one locking magnet.

In the case of a plurality of locking elements, it may also be advisable with regard to the security against the swivel lever being adjusted unauthorised if the polarities of at least two locking magnets of different locking elements differ, namely in relation to the unlocking direction of the respective locking element. In this way, a type of coding can be implemented such that it is made more difficult for unauthorised persons to adjust all locking elements into the respective unlocking position. In this regard, it may in particular be advisable if the polarities of at least two adjacently arranged locking magnets differ. Irrespective of this, the unlocking direction of a locking element is understood in particular as the direction in which the locking element can be adjusted from the locking position to the unlocking position.

Alternatively or additionally, it can be advisable in the case of a plurality of locking elements if at least two of the locking elements are arranged on opposing sides of the longitudinal axis of the swivel lever and/or the longitudinal axis of the housing. In this way, the swivel lever can be held on the housing on opposing sides of its longitudinal axis in a positive-locking manner in the latched position. This can increase the security against the swivel lever being forcibly adjusted from the latched position to the actuating position. This applies all the more if at least two locking element groups each comprising at least two, in particular at least three, locking elements are arranged on opposing sides of the longitudinal axis of the swivel lever and/or the longitudinal axis of the housing.

Irrespective of whether locking elements are arranged on different sides of the longitudinal axis of the swivel lever and/or of the housing, it may be advisable if at least two of the locking elements are arranged spaced apart from one another along the longitudinal axis of the swivel lever and/or the longitudinal axis of the housing. The swivel lever can then be held on the housing at different points along its longitudinal axis in a positive-locking manner in the latched position. This also increases the security against the swivel lever being forcibly adjusted from the latched position to the actuating position. This applies in particular if at least two locking elements of a locking element group are arranged spaced apart from one another along the longitudinal axis of the swivel lever and/or the longitudinal axis of the housing. Irrespective of this, it may be advisable for the sake of simplicity if the distances of adjacent locking elements along the longitudinal axis of the swivel lever and/or the housing are the same.

With regard to simple functioning and structural configuration of the locking mechanism, it may be advisable if the adjustment of the at least one locking element from the locking position to the unlocking position and back can take place by displacement. In this case, the displacement can take place particularly simply along the longitudinal axis of the locking element. Alternatively or additionally, with regard to a compact and in particular flat design of the swivel lever device, it may also be expedient if the displacement can take place at least substantially parallel to a contact surface of the housing for contact with the access control device.

Alternatively or additionally, it may be advisable with regard to simple structural configuration of the at least one locking element and of the locking mechanism if the at least one locking element is formed by the at least one locking magnet. In this case, the locking magnet is in particular not only a part of the locking element, but the locking element is designed as a locking magnet Irrespective of this, it may be sensible in the same context if the at least one locking element is designed in a pin-shaped manner.

According to a further configuration of the swivel lever device, in the latched position of the swivel lever, the at least one locking element is received in the housing and/or in the swivel lever in the locking position and/or in the unlocking position in such manner that the locking element is inaccessible from the outside. If the swivel lever is in the latched position, the at least one locking element can thus be inaccessible from the outside, in particular regardless of whether the locking element is in the locking position or the unlocking position. This further increases the security against damage to the locking mechanism from the outside. Alternatively or additionally, it can be provided that the at least one locking element is received in the housing and/or in the swivel lever in the locking position and/or in the unlocking position in such manner that the locking element is not visible from the outside when the swivel lever is in the latched position. In this way, the security against the locking element being adjusted unauthorised from the locking position to the unlocking position can be increased. In this case, it is in particular not apparent from the outside where the locking element is arranged and how exactly a magnet must be positioned relative to the swivel lever device in order to adjust the locking element from the locking position to the unlocking position. Irrespective of this, it is expedient if, in the latched position of the swivel lever, the locking element is received partially in the housing and partially in the swivel lever in the locking position and/or in the housing or the swivel lever in the unlocking position.

A further configuration of the swivel lever device provides that the at least one locking element is received in an unlocking receptacle in the unlocking position, in particular independently of the position of the swivel lever. This makes it easy to prevent damage to the locking element when the locking element is in the unlocking position. In this case, the unlocking receptacle can expediently be part of the housing. However, with regard to simple functioning of the locking mechanism, it is in particular advisable if the unlocking receptacle is part of the swivel lever. Irrespective of whether or not the locking element is received in an unlocking receptacle in the unlocking position, the at least one locking element can engage into a locking receptacle in a positive-locking manner in the locking position when the swivel lever is in the latched position. Thus, the adjustment of the swivel lever from the latched position to the actuating position can be blocked in a constructively simple and positive-locking manner. In this case, the locking receptacle can be part of the swivel lever. However, it is preferred if the locking receptacle is formed by the housing. This may be advisable with regard to simple functioning of the locking mechanism. Irrespective of this, it may be advantageous with regard to a simple structural configuration and high stability of the swivel lever device if the unlocking receptacle and/or the locking receptacle is not only part of the housing or of the swivel lever, but is formed by the housing and/or the swivel lever.

In order to prevent the at least one locking element from unintentionally remaining in the unlocking position when the swivel lever is adjusted from the actuating position to the latched position, the locking mechanism can comprise at least one securing element. The at least one securing element can then be designed to automatically adjust the at least one locking element from the unlocking position to the locking position when the swivel lever is adjusted to the latched position. The locking element can then be automatically adjusted by the securing element from the unlocking position to the locking position when the swivel lever is adjusted to the latched position. In this way, the security against the swivel lever being adjusted unauthorised from the latched position to the actuating position can be increased. Alternatively or additionally, the at least one securing element can also be designed to hold the at least one locking element in the locking position when the swivel lever is in the latched position. This can also contribute to increased security against the swivel lever being adjusted unauthorised from the latched position to the actuating position. Irrespective of this, it may be advisable for the sake of simplicity in the case of a plurality of locking elements if the at least one securing element is assigned to a plurality of locking elements. This means that a separate securing element does not have to be provided for each locking element.

With regard to the at least one securing element, it may be expedient if this is fastened to the swivel lever. However, with regard to simple functioning of the locking mechanism, it is in particular advisable if the at least one securing element is fastened to the housing. Alternatively or additionally, the at least one securing element can be received at least partially, in particular at least substantially, in the housing or in the swivel lever. This ensures that the securing element is inaccessible from the outside, which can increase the security against damage to the locking mechanism due to vandalism and the locking element being adjusted unauthorised from the locking position to the unlocking position.

Irrespective of this, it may also be advisable if the at least one securing element is formed from a ferromagnetic material. The at least one locking element can then be automatically adjusted from the unlocking position to the locking position by means of the magnetic interaction between the at least one locking magnet and the at least one securing element when the swivel lever is adjusted to the latched position. The automatic adjustment of the locking element from the locking position to the unlocking position can therefore take place by means of the magnetic interaction between the locking magnet and the securing element. This not only enables a particularly simple structural configuration, but also a reliable functioning of the locking mechanism. For the same reason, it may alternatively or additionally be advantageous if, in the latched position of the swivel lever, the at least one locking element is held in the locking position by means of the magnetic interaction between the at least one locking magnet and the at least one securing element. In principle, the automatic adjustment of the locking element and/or the holding of the locking element in the locking position can take place at least partially by means of the magnetic interaction between the locking magnet and the securing element. For the aforementioned reasons, however, it is particularly preferred if the automatic adjustment of the locking element and/or the holding of the locking element in the locking position takes place at least substantially by means of the magnetic interaction between the locking magnet and the securing element.

In this case, a ferromagnetic material is in particular understood to be a material which is attracted by an external magnetic field. In principle, the securing element can also be designed as a permanent magnet. However, with regard to the simple and reliable functioning of the locking mechanism, it is preferred if the securing element itself does not generate a magnetic field.

Irrespective of whether or not a securing element is provided, the locking mechanism can comprise at least one retaining element. The at least one retaining element can then be designed to prevent the at least one locking element from being unintentionally adjusted from the unlocking position to the locking position, in particular when the swivel lever is in the actuating position. In this way, simple and reliable functioning of the swivel lever device can be ensured. A structurally simple configuration of the retaining element is enabled if the at least one retaining element at least partially covers at least one opening of at least one unlocking receptacle in which the at least one locking element is received in the unlocking position. Irrespective of this, it may be advisable in the case of a plurality of locking elements if at least two locking elements are assigned to the at least one retaining element A separate retaining element does not then have to be provided for each locking element, which can have a positive effect on the manufacturing costs of the swivel lever device.

Alternatively or additionally, it can also contribute to the simple operation of the swivel lever device if the at least one retaining element is fastened to the housing and/or to the swivel lever so as to be undetachable.

With regard to the retaining element, it may alternatively or additionally also be advisable if the at least one retaining element can be adjusted between a retaining position and a release position. The retaining element, in the retaining position, can then prevent the at least one locking element from being unintentionally adjusted from the unlocking position to the locking position and, in the release position, can release the at least one locking element for being adjusted from the unlocking position to the locking position. In this way, it can be achieved that the retaining element does not impede the locking element from being adjusted when the swivel lever is in the latched position. In this case, it may be advisable with regard to a simple design if the at least one retaining element at least partially covers the at least one opening of the at least one unlocking receptacle in the retaining position and at least substantially releases the at least one opening of the at least one unlocking receptacle in the release position.

Alternatively or additionally, it may be advisable if the at least one retaining element can be automatically adjusted from the retaining position to the release position when the swivel lever is adjusted from the actuating position to the latched position. This has the advantage that the retaining element automatically moves into the release position when the swivel lever is adjusted and does not have to be adjusted separately, for example by a user, into the release position. This not only ensures reliable functioning, but also facilitates the operation of the swivel lever device. Against the same background, it may alternatively or additionally also be advisable if the at least one retaining element can be automatically adjusted from the release position to the retaining position when the swivel lever is adjusted from the latched position to the actuating position. This can safely prevent the locking element from being unintentionally adjusted from the unlocking position to the locking position.

The automatic adjustment of the at least one retaining element can be implemented in a constructively simple manner if at least one adjustment element is provided to adjust the at least one retaining element in a positive-locking manner from the retaining position to the release position when the swivel lever is adjusted from the actuating position to the latched position. Alternatively or additionally, it may be advisable for the same reason if at least one adjustment element is provided to adjust the at least one retaining element in a positive-locking manner from the release position to the retaining position when the swivel lever is adjusted from the latched position to the actuating position.

With regard to a structurally simple and at the same time expedient configuration of the at least one retaining element, it may be advisable if it is designed as a rope. Thus, a retaining element can be implemented in a simple and cost-effective manner with which in particular a plurality of locking elements can be secured simultaneously against being unintentionally adjusted from the respective unlocking position to the corresponding locking position. Irrespective of this, it may be advantageous with regard to the durability of the retaining element if it is designed as a wire rope or wire.

Alternatively or additionally, it may be advisable if the retaining element is held on the swivel lever and/or on the housing via a spring means. In this way, an automatic adjustment of the retaining element from the retaining position to the release position and/or vice versa can also be implemented in a simple manner. With regard to simple functioning of the locking mechanism, it is thereby expedient if the retaining element is held on the swivel lever. Alternatively or additionally, the at least one retaining element itself can also be designed as a spring means, even in this way an automatic adjustment of the retaining element can be implemented in a simple manner.

The object described above is achieved in the case of a system in that the swivel lever device is designed as described herein and in that the key unit has at least one unlocking magnet for adjusting the locking element from the locking position to the unlocking position by means of the magnetic interaction between the locking magnet and the unlocking magnet.

In addition to the swivel lever device described above, the system therefore comprises a corresponding key unit. This key unit has at least one unlocking magnet, which is designed to adjust the at least one locking element from the locking position to the unlocking position, namely by means of the magnetic interaction between the unlocking magnet and the at least one locking magnet of the locking element. The key unit can thus be used to unlock the locking mechanism of the swivel lever device and thus adjust the swivel lever from the latched position to the actuating position.

Like the locking magnet, the at least one unlocking magnet is in particular a permanent magnet. In this case, it may be expedient with regard to simple functioning of the system if the magnetic field of the at least one unlocking magnet has a greater field strength than the magnetic field of the at least one locking magnet.

According to an expedient configuration of the system, it is provided that the key unit can be adjusted relative to the swivel lever and/or to the housing from a non-use position to a release position for unlocking the swivel lever device. Thus, by adjusting the key unit from the non-use position to the release position, the at least one locking element of the swivel lever device can be adjusted from the locking position to the unlocking position when the swivel lever is in the latched position. Irrespective of this, it may be advisable if the key unit, in the release position, rests in a positive-locking manner on the swivel lever device in at least two directions perpendicular to one another. This allows the key unit to be easily and precisely adjusted to the release position. This applies all the more if the key unit, in the release position, rests in a positive-locking manner on the swivel lever device in three directions perpendicular to one another.

Alternatively or additionally, it may be advisable if the key unit, in the release position, in particular independently of the position of the swivel lever, is held in a positive-locking manner on the swivel lever in at least one pair of opposing directions. After unlocking the swivel lever device, the swivel lever can then be easily adjusted together with the key unit relative to the housing, which can simplify the operation of the system. This applies in particular if the key unit, in the release position, is held in a positive-locking manner on the swivel lever in two vertical pairs of opposing directions. With regard to simple operation of the system, it may alternatively or additionally be advantageous if the swivel lever device, in particular the swivel lever, has at least one guide element for guided adjustment of the key unit from the non-use position to the release position and back. This makes it easy to adjust the key unit between the non-use position and the release position. For this reason, it may alternatively or additionally be advantageous if the key unit can be displaced between the non-use position and the release position. The key unit can then be easily pushed onto the swivel lever device, in particular the swivel lever, and also be easily pushed down by the swivel lever device, in particular the swivel lever.

Finally, a further configuration of the system is characterised in that the key unit is designed as a master key unit which, in particular in addition to the at least one unlocking magnet, has at least one master unlocking magnet. This master unlocking magnet can then be used to unlock at least one further swivel lever device, which can in particular be designed differently from the swivel lever device of the system in relation to the position of the at least one locking element. In this way, different swivel lever devices can be unlocked with one key unit. Against this background, it may be expedient if no locking element of the swivel lever device is assigned to the at least one master unlocking magnet of the key unit. The number of locking elements can then be smaller than the sum of the unlocking magnets and master unlocking magnets.

BRIEF DESCRIPTION OF THE DRAWINGS

The invention will be explained in more detail below with reference to a drawing which represents only one preferred exemplary embodiment, in which is shown.

DESCRIPTION OF THE INVENTION

Figure 1:
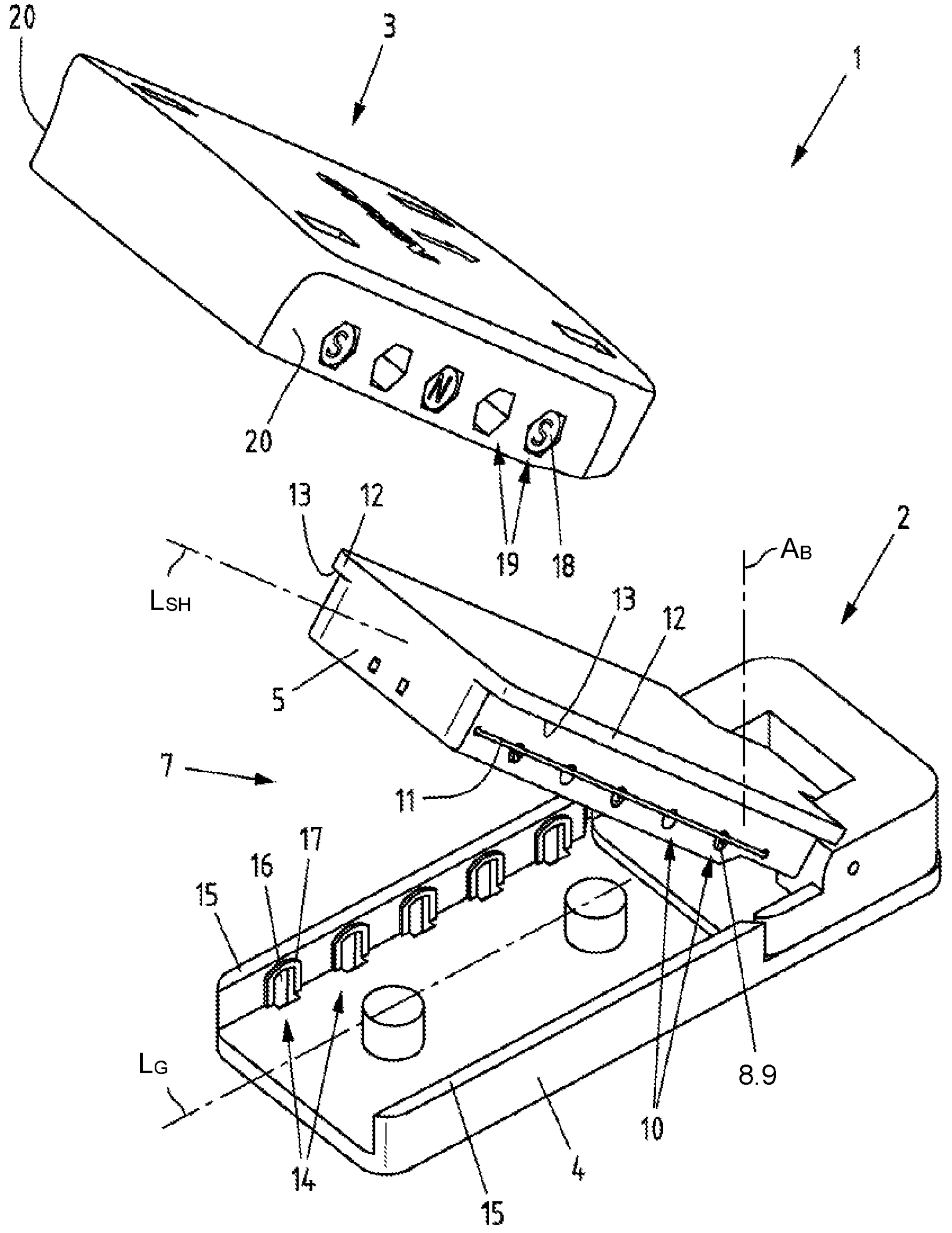
FIG. 1 a system according to the invention comprising a swivel lever device and a key unit in a perspective view, wherein the key unit is represented in a non-use position and a swivel lever of the swivel lever device is represented in an actuating position, FIG. 2 the key unit from FIG. 1 in a perspective view from below, FIG. 3A-C the swivel lever device from FIG. 1 in different views, wherein the swivel lever is respectively represented in a latched position, FIG. 4A-B the system from FIG. 1 in different views, wherein the key unit is respectively represented in a release position and the swivel lever is respectively represented in the latched position, FIG. 5 the system from FIG. 1 in a perspective view, wherein the key unit is represented in the release position and the swivel lever is represented in the actuating position FIG. 6A-B in each case a detail of the swivel lever device from FIG. 1 in a sectional view along the section plane VI-VI represented in FIG. 3B, wherein the swivel lever is represented in different positions, and FIG. 7 the swivel lever device from FIG. 1 in a lateral view, wherein the swivel lever device is fastened to an access control device

FIG. 1 shows a system 1 according to the invention comprising a swivel lever device 2 and a corresponding key unit 3 in a perspective view. The swivel lever device 2 comprises a housing 4 and a swivel lever 5. The swivel lever 5 adopts an actuating position in FIG. 1. In the actuating position, the swivel lever 5 can be pivoted relative to the housing 4 about an actuating axis $A_B$. In this way, a closure apparatus 6 (not represented in FIG. 1) can be actuated by means of the swivel lever 5.

In addition to the housing 4 and the swivel lever 5, the swivel lever device 2 has a locking mechanism 7. The locking mechanism 7 comprises a plurality of locking elements 8, which are in the present case formed by locking magnets 9. In this case, the locking elements 8 are arranged in the exemplary embodiment represented and in this respect preferred on opposing sides of the longitudinal axis $L_{SH}$ of the swivel lever 5. In FIG. 1, the locking elements 8 adopt unlocking positions in which the locking elements 8 are each received in an unlocking receptacle 10 of the swivel lever 5. In this case, only a part of the unlocking receptacles 10 of the swivel lever 5 is occupied with locking elements 8. In order to increase security, it could alternatively be provided that a large part of the unlocking receptacles 10, in particular all unlocking receptacles 10, is occupied with a locking element 8.

The locking mechanism 7 comprises two retaining elements 11 in the present case. These are designed as wire ropes in the exemplary embodiment represented and in this respect preferred. The retaining elements 11 are arranged on opposing longitudinal sides of the swivel lever 5 and held on the swivel lever 5 at their longitudinal ends. For this purpose, the longitudinal ends of the retaining elements 11 are inserted into receptacles of the swivel lever 5 and held on the swivel lever 5 in the receptacles in a manner not represented via spring means. In FIG. 1, the retaining elements 11 adopt retaining positions in which the retaining elements 11 each partially cover the openings of the unlocking receptacles 10 arranged on the corresponding side of the swivel lever 5. This prevents the locking elements 8 from accidentally slipping out of the unlocking receptacles 10. Above the retaining elements 11, the swivel lever 5 has two guide elements 12, which extend along the longitudinal axis $L_{SH}$ of the swivel lever 5 in the exemplary embodiment represented and in this respect preferred. In this case, the guide elements 12 each form an undercut 13, behind which the key unit 3 can engage.

The housing 4 has a plurality of locking receptacles 14, which are formed into opposing side walls 15 of the housing 4 in the exemplary embodiment represented and in this respect preferred. In this case, the locking receptacles 14 are arranged spaced apart from one another along the longitudinal axis $L_G$ of the housing 4. The rear walls of the locking receptacles 14 are in the present case formed by two securing elements 16 in the form of metallic plates, which are provided for interaction with the locking elements 8 designed as locking magnets 9. The securing elements 16 are thereby received in the side walls 15 of the housing 4. In addition, the housing 4 has a plurality of adjustment elements 17. The adjustment elements 17 are provided for positive-locking adjustment of the retaining elements 11 designed as wire ropes. In this case, the adjustment elements 17 are formed as projections which extend inwards from the inner sides of the side walls 15 of the housing 4.

The key unit 3 has a plurality of unlocking magnets 18 which are received in corresponding receptacles 19 of the key unit 3. In this case, the receptacles 19, in the exemplary embodiment represented and in this respect preferred, are arranged in opposing side walls 20 of the key unit 3 and are designed as through openings. Alternatively, however, it could also be provided that the receptacles 19 are closed outwards such that the unlocking magnets 18 are inaccessible from the outside.

Figure 2:
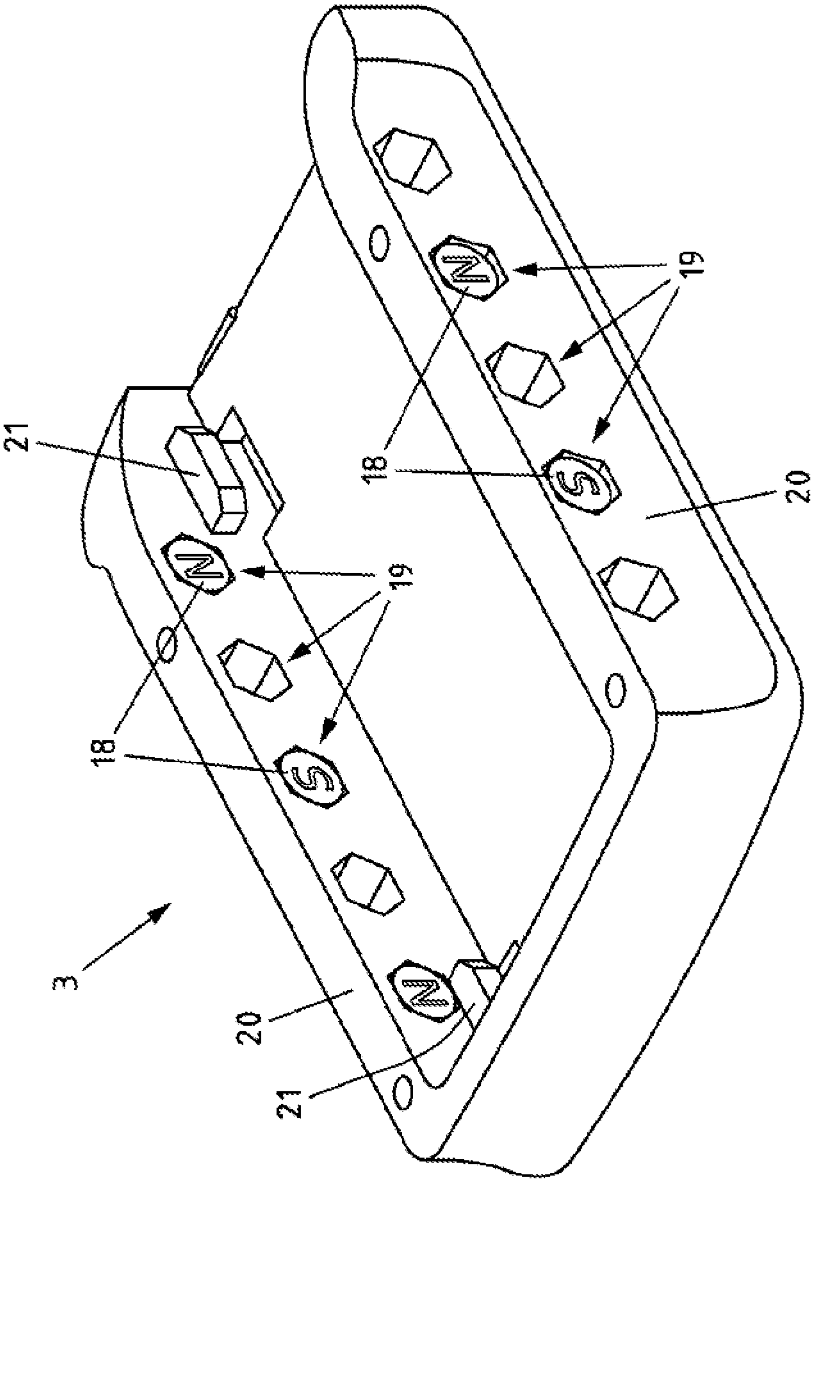

FIG. 2 shows the key unit 3 in a perspective view from below. The key unit 3 forms a recess open to the underside, with which the key unit 3 can be pushed along the longitudinal axis $L_{SH}$ of the swivel lever 5 onto the swivel lever device 2 or the swivel lever 5. In this case, the key unit 3 has two retaining elements 21 on the opposing inner sides of its side walls 20, which can engage behind the undercuts 13 formed by the two guide elements 12 of the swivel lever 5 when pushing the key unit 3 onto the swivel lever 5.

Figure 3A:
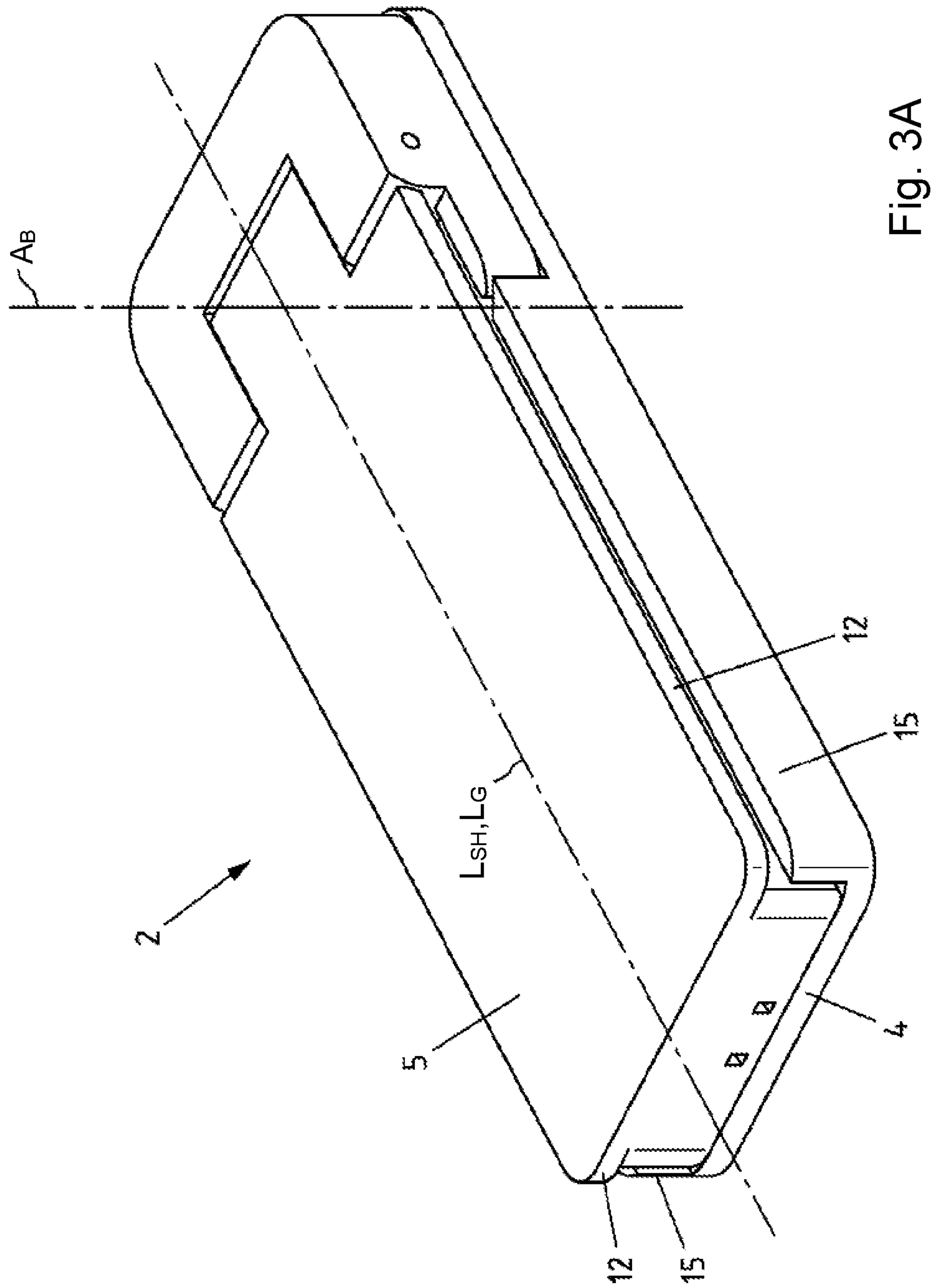
Figure 3B:
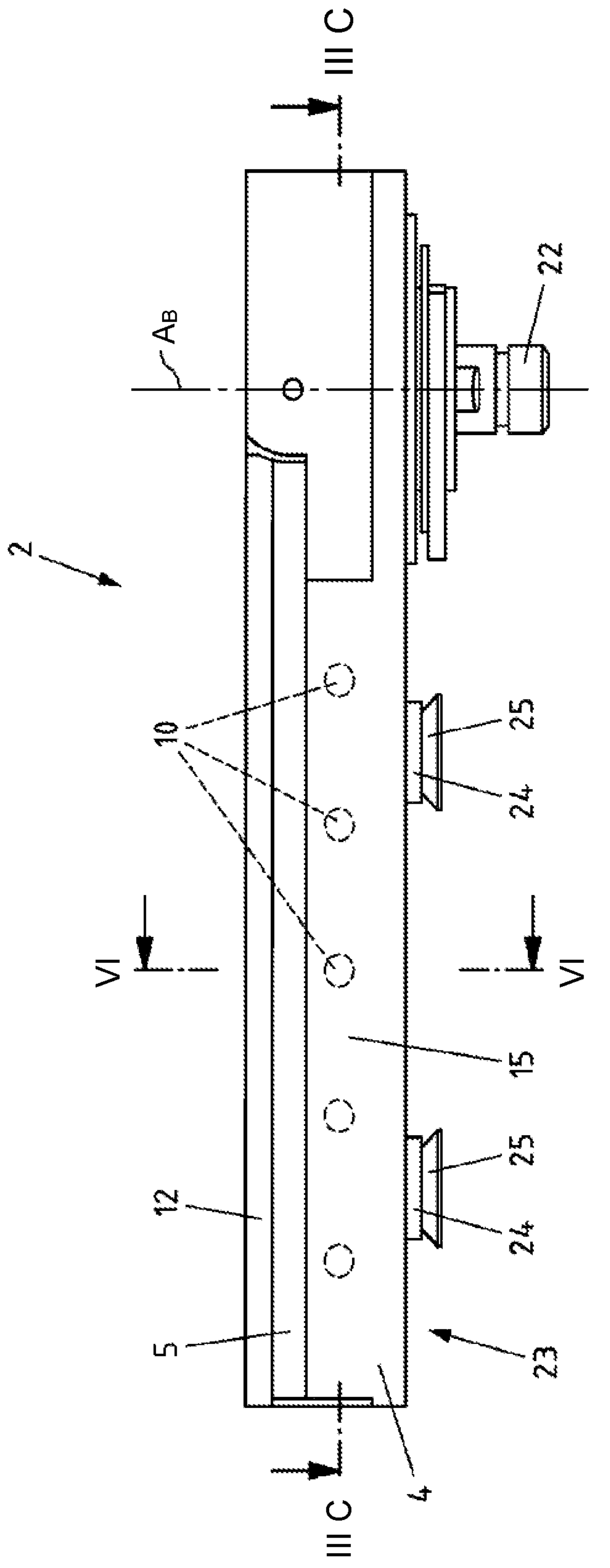
Figure 3C:
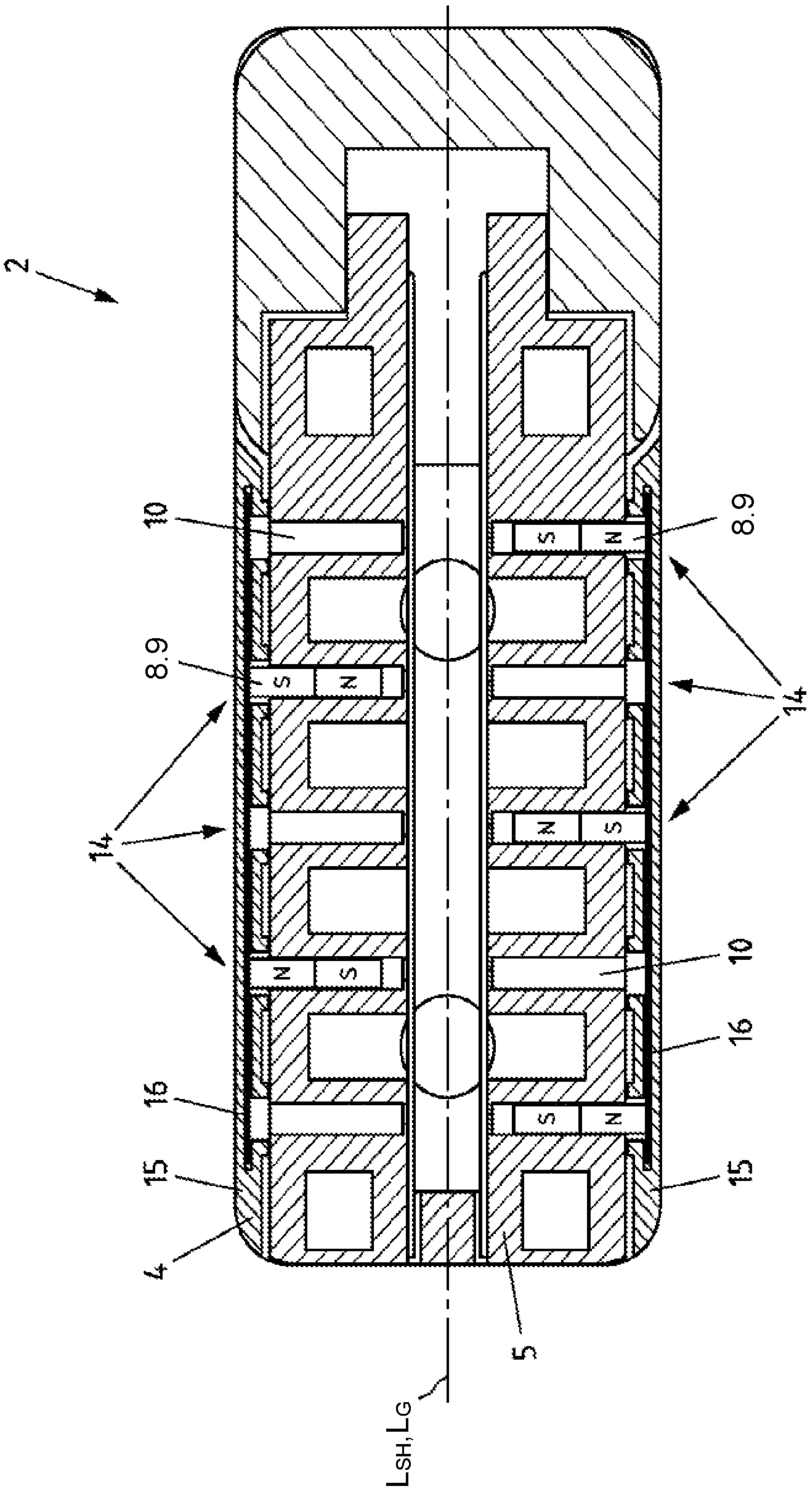

From the actuating position represented in FIG. 1, the swivel lever 5 can be pivoted relative to the housing 4 about an axis, which is arranged in the present case perpendicular to the actuating axis $A_B$, into the latched position represented in FIG. 3A-C. When pivoting the swivel lever 5 into the latched position, the retaining elements 11 in the form of the wire ropes come into contact with the adjustment elements 17 designed as projections. As a result, the retaining elements 11 are adjusted upwards in sections and are thus adjusted from the retaining position represented in FIG. 1 to a release position, in which the retaining elements 11 release the openings of the unlocking receptacles 10. The locking elements 8 in the form of the locking magnets 9 are then pulled by the magnetic interactions between them and the locking elements 16 designed as metal plates in the direction of the securing elements 16. In this way, the locking elements 8 are automatically adjusted from the unlocking position represented in FIG. 1 to a locking position, in which the locking elements 8 engage into the locking receptacles 14.

FIG. 3A-C show the swivel lever device 2 in different views, wherein the swivel lever 5 is in each case represented in the latched position. FIG. 3A shows the swivel lever device 2 in a perspective view. In the latched position, the swivel lever 5 is partially received in the housing 4. In this case, pivoting of the swivel lever 5 about the actuating axis $A_B$ is blocked in an positive-locking manner by the two side walls 15 of the housing 4.

FIG. 3B shows the swivel lever device 2 in a side view, wherein the unlocking receptacles 10 of the swivel lever 5 are represented with dashed lines. The swivel lever 5 is connected to a coupling element 22 in a torque-resistant manner about the actuating axis $A_B$. In this case, the coupling element 22 is designed to connect the swivel lever 5 to a closure apparatus 6 not represented in FIG. 3, for example in the form of a bolt closure means and/or a bar closure means. The housing 4 has two fastening elements 24 projecting from its underside 23, which in FIG. 3 are only represented schematically. In the exemplary embodiment represented and in this respect preferred, these fastening elements 24 each form an internal thread into which a screw 25 is screwed.

FIG. 3C shows the swivel lever device 2 in a sectioned view along the section plane IIIC-IIIC represented in FIG. 3B, wherein the locking elements 8 are represented in the respective locking position. In the locking position, the locking elements 8 in the form of the locking magnets 9 are partially received in the unlocking receptacles 10 formed by the swivel lever 5. In addition, the locking elements 8 engage in a positive-locking manner into the locking receptacles 14 formed by the housing 4. In this way, pivoting of the swivel lever 5 from the latched position (FIG. 3A-C) to the actuating position (FIG. 1) is blocked in a positive-locking manner. In this case, the locking elements 8 are held in the locking position by means of the magnetic interactions between them and the securing elements 16 received in the side walls 15 of the housing 4, in this case designed as metal plates. To adjust the swivel lever 5 from the latched position represented in FIG. 3A-C back to the actuating position represented in FIG. 1, the key unit 3 can be adjusted relative to the swivel lever device 2 or to the swivel lever 5 into the release position represented in FIG. 4A-B.

Figure 4A:
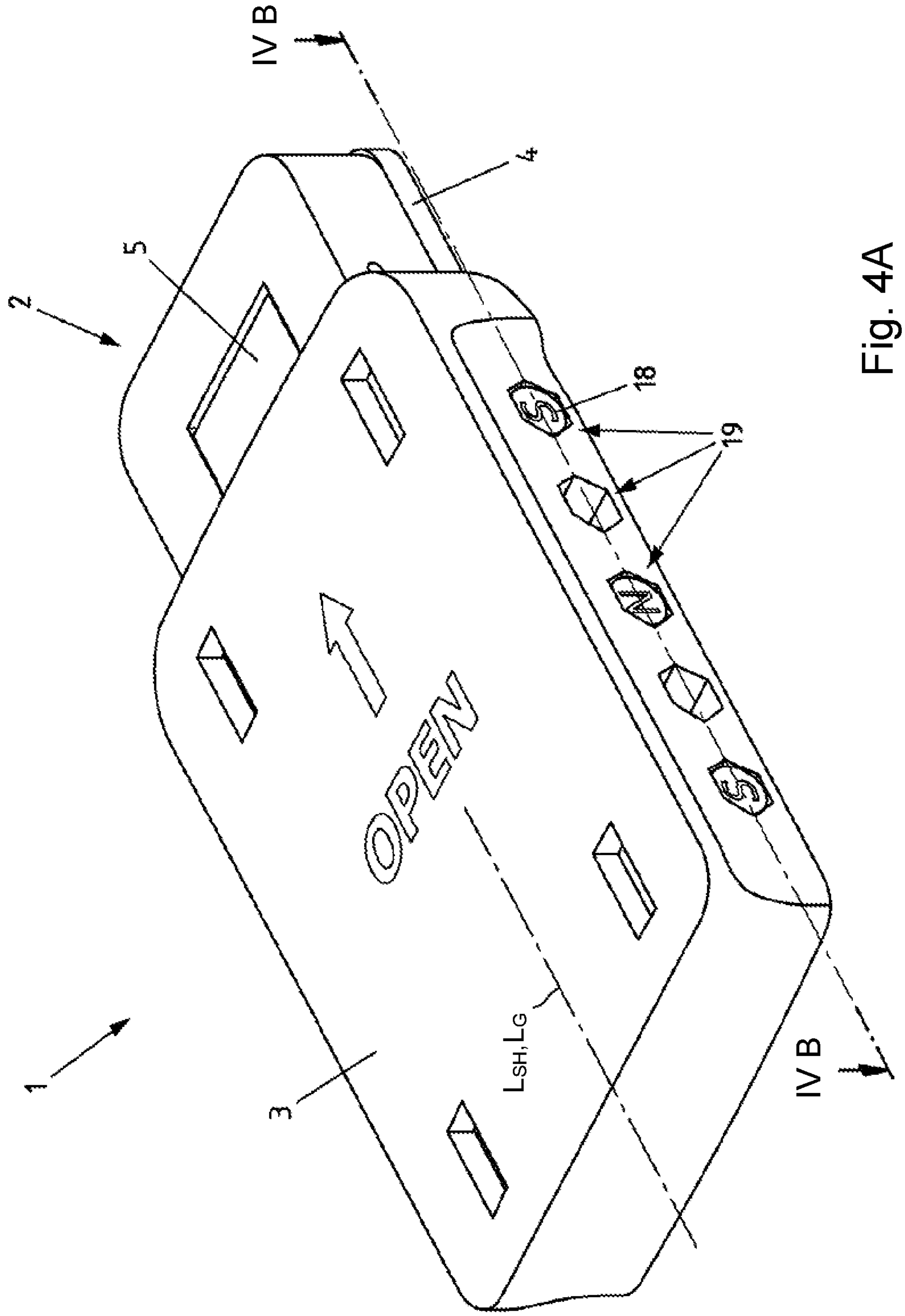
Figure 4B:
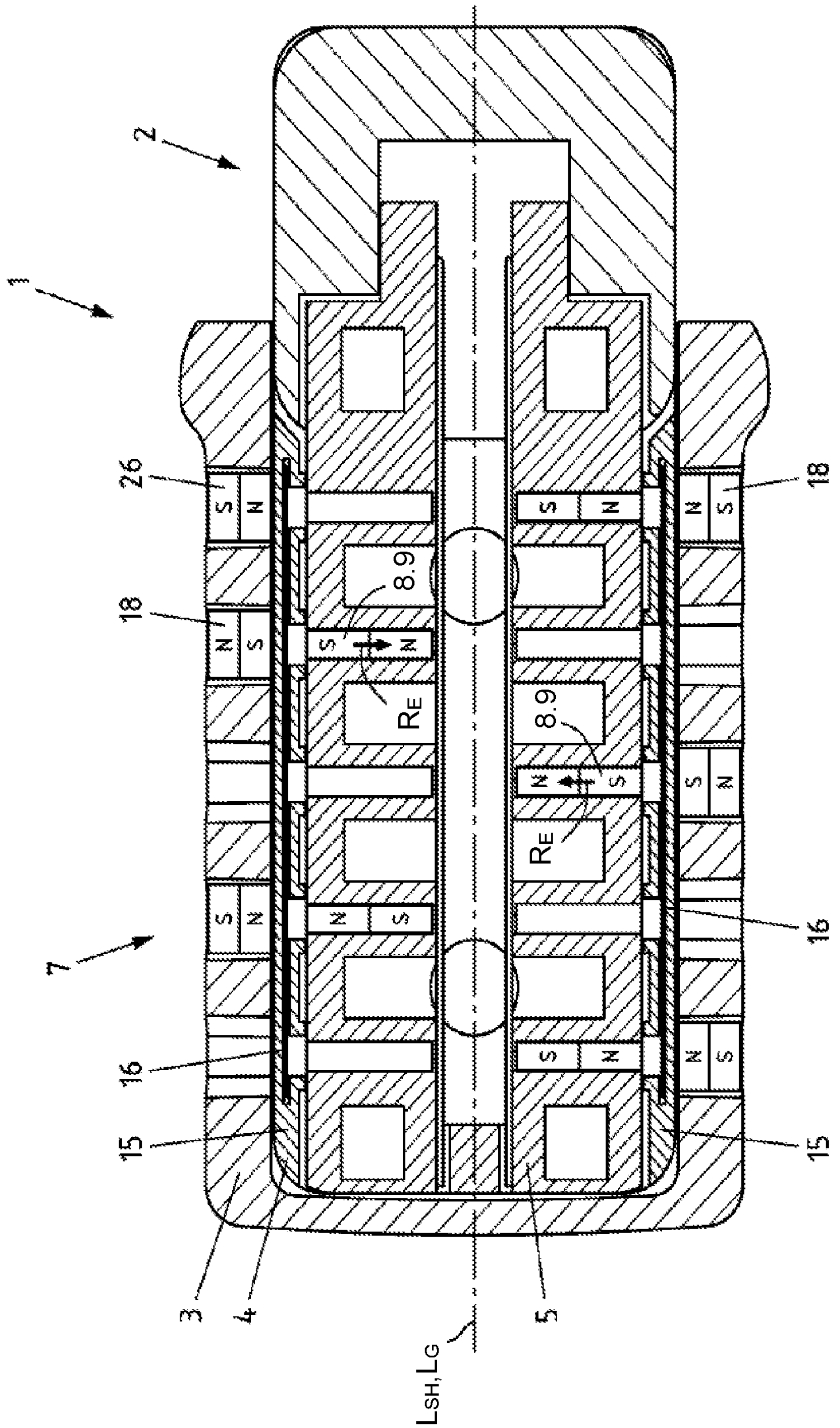

FIG. 4A-B show the system 1 in different views, wherein the swivel lever 5 is respectively represented in the latched position and the key unit 3 is respectively represented in the release position. FIG. 4A shows the system 1 in a perspective view. In the release position, the key unit 3 is pushed along the longitudinal axis $L_{SH}$ of the swivel lever 5 onto the swivel lever device 2 or the swivel lever 5. In this case, the key unit 3 is held on the swivel lever 5 in a positive-locking manner perpendicular to the longitudinal axis $L_{SH}$ of the swivel lever 5.

FIG. 4B shows the system 1 in a sectioned view along the section plane IVB-IVB represented in FIG. 4A, wherein the locking elements 8 are represented in the respective unlocking position. The unlocking magnets 18 received in the key unit 3 have a higher field strength than the locking magnets 9 of the swivel lever device 2. The locking magnets 9 are thus displaced from the locking position (FIG. 3C) to the unlocking position (FIG. 4B) by means of the magnetic interactions with the unlocking magnets 18. The unlocking magnets 18 thus press the locking magnets 9 into the unlocking positions against the magnetic attraction between the locking magnets 9 and the securing elements 16. The swivel lever device 2 can be unlocked in this way.

In the present case, the locking elements 8 of the swivel lever device 2 are designed in the same way, namely as cylindrical pins. However, the polarities of the locking elements 8 designed as locking magnets 9 differ in relation to the respective unlocking direction $R_E$, in which the corresponding locking element 8 can be adjusted from the locking position (FIG. 3C) to the unlocking position (FIG. 4C). Thus, the locking magnets 9 have at the end pointing in the unlocking direction $R_E$ partially a south pole S and partially a north pole N. This can increase the security against the swivel lever device 2 being unlocked unauthorised.

In the present case, the key unit 3 is designed as a master key unit and has, in addition to the unlocking magnets 18, a master unlocking magnet 26. The unlocking magnets 18 and the master unlocking magnet 26 are thereby designed in the same way. In contrast to the unlocking magnets 18, however, no locking element 8 of the swivel lever device 2 is assigned to the master unlocking magnet 26. Further swivel lever devices different from the represented swivel lever devices 2 in regard to the position of their locking elements 8 can be unlocked by means of the master unlocking magnet 26. Thus, swivel lever devices 2 can also be unlocked with the key unit 3, which, in contrast to the swivel lever device 2 represented, have a locking element 8 at the position of the master unlocking magnet 26.

In the release position, the key unit 3 is connected via the holding elements 21 (FIG. 2) not visible in FIGS. 4A-B and the side walls 20 of the key unit 3 are connected in a positive-locking manner to the swivel lever 5 perpendicular to the longitudinal axis $L_{SH}$ thereof. Thus, the swivel lever 5 together with the key unit 3 can be adjusted from the latched position represented in FIG. 4A-B into the actuating position represented in FIG. 5 and pivoted about the actuating axis $A_B$ in this actuating position.

Figure 5:
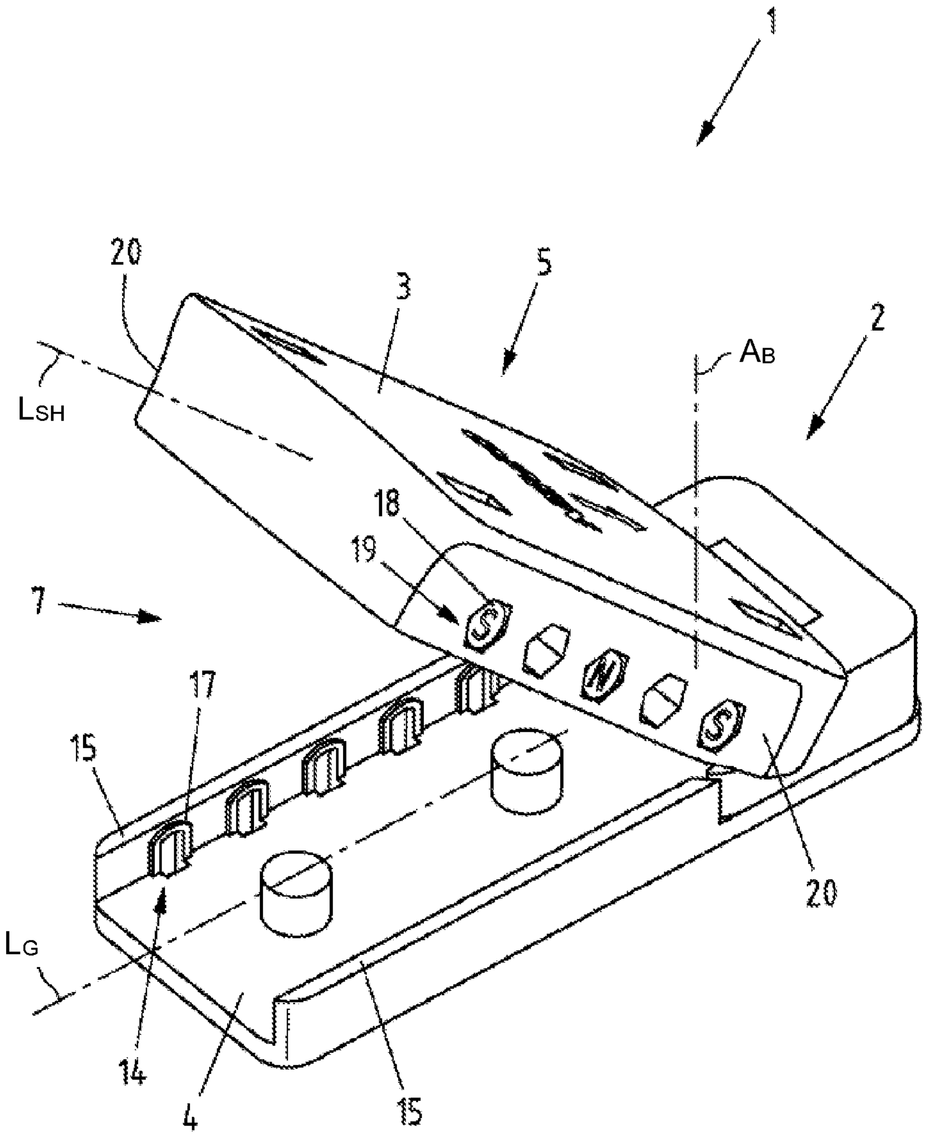

FIG. 5 shows the system 1 in a perspective view, wherein the swivel lever 5 is represented in the actuating position and the key unit 3 is represented in the release position. In the actuating position, the key unit 3 can be pulled down along the longitudinal axis $L_{SH}$ of the swivel lever 5 by the swivel lever and thus adjusted from the release position represented in FIG. 5 to a non-use position (see FIG. 1).

Figure 6A:
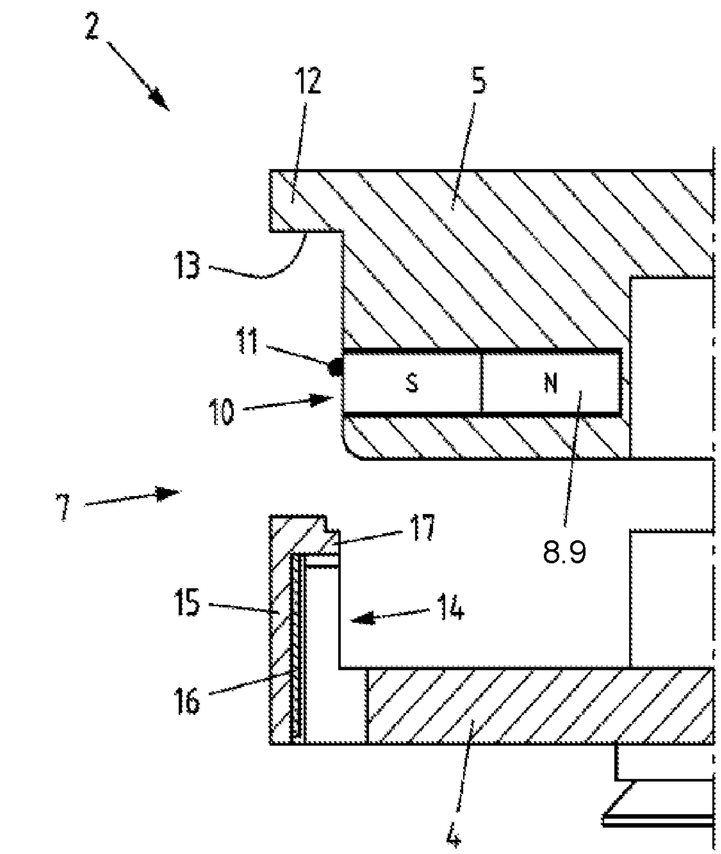
Figure 6B:
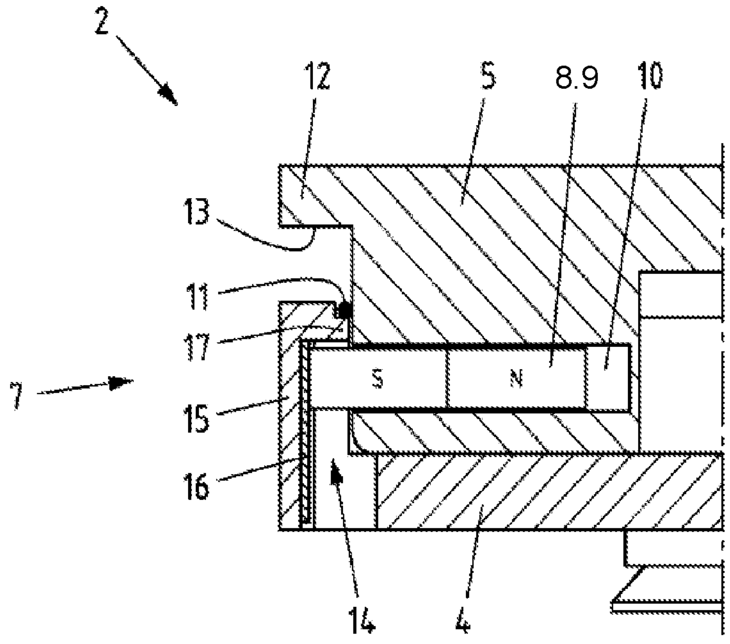

FIG. 6A-B each show a detail of the swivel lever device 2 in a sectioned view along the section plane VI-VI represented in FIG. 3B, wherein the swivel lever 5 is represented in an intermediate position (FIG. 6A) when adjusting from the actuating position to the latched position and in the latched position (FIG. 6B). When adjusting into the latched position, the retaining elements 11 come into contact with the adjustment elements 17 designed as projections and are thus automatically adjusted from the retaining position (FIG. 6A) to the release position (FIG. 6B), in which the retaining elements 11 release the openings of the unlocking receptacles 10. If the swivel lever 5 is adjusted by means of the key unit 3 not represented in FIG. 6A-B from the latched position (FIG. 6B) back into the actuating position, the retaining elements 11 are adjusted by the spring means, via which the retaining elements 11 are held on the swivel lever 5, from the release position (FIG. 6B) back to the retaining position (FIG. 6*a*).

Figure 7:
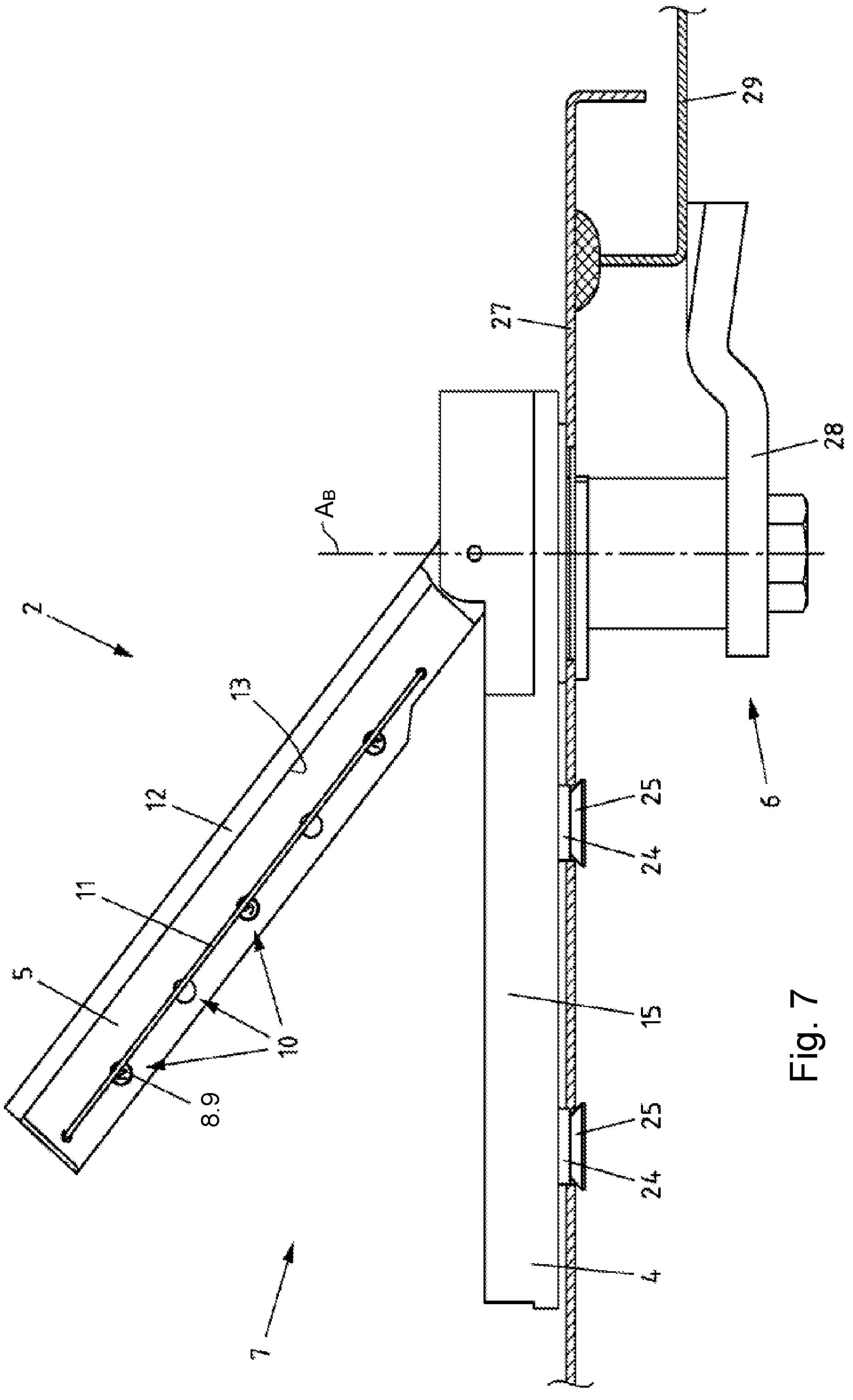

FIG. 7 shows the swivel lever device 2 in a side view, wherein the swivel lever 5 is represented in the actuating position. The swivel lever device 2 is fastened to an access control device 27, for example in the form of a thin-walled door or a hatch, by means of the fastening elements 24 of the housing 4 and the screws 25. In this case, the swivel lever 5 is connected to a closure apparatus 6, which is designed in the present case as a rotary bolt closure means. By pivoting the swivel lever 5 about the actuating axis $A_B$, a rotary bolt 28 of the rotary bolt closure means can be pivoted. In this way, the positive-locking closure between the rotary bolt 28 and a frame 29, on which the access control device 27 is held in an adjustable, in particular pivotable manner, can be released and the access control device 27 can thus be opened.

LIST OF REFERENCE NUMERALS

- 1: System
- 2: Swivel lever device
- 3: Key unit
- 4 Housing
- 5: Swivel lever
- 6: Closure apparatus
- 7: Locking mechanism
- 8: Locking element
- 9: Locking magnet
- 10: Unlocking receptacle
- 11: Retaining element
- 12: Guide element
- 13: Undercut
- 14: Locking receptacle
- 15: Side wall (of the housing 4)
- 16: Securing element
- 17: Adjustment element
- 18: Unlocking magnet
- 19: Receptacle
- 20: Side wall of the key unit
- 21: Holding element
- 22: Coupling element
- 23: Underside of the housing
- 24: Fastening element
- 25: Screw
- 26: Master unlocking element
- 27: Access control device
- 28: Rotary bolt
- 29: Frame
- $A_B$: Actuating axis
- $L_{SH}$: Longitudinal axis of the swivel lever
- $L_G$: Longitudinal axis of the housing
- N: North pole
- $R_E$: Unlocking apparatus
- S: South Pole

The invention claimed is:

1. A swivel lever device for actuating a closure apparatus comprising one or both of a bolt closure means and a bar closure means of an access control device, wherein the access control device comprises one or both of a door and a hatch, the swivel lever device having:

a housing for fastening the swivel lever device to the access control device, and a swivel lever for actuating the closure apparatus, wherein the swivel lever can be adjusted relative to the housing between a latched position and an actuating position for actuating the closure apparatus (6), wherein the swivel lever can be pivoted in the actuating position about an actuating axis relative to the housing, wherein a locking mechanism is provided to secure the swivel lever against unauthorised adjustment from the latched position to the actuating position, and wherein the locking mechanism comprises at least one locking element which can be adjusted between a locking position for positively blocking the swivel lever from being adjusted from the latched position to the actuating position and an unlocking position for releasing the swivel lever for being adjusted from the latched position to the actuating position, wherein the locking element comprises at least one locking magnet for adjusting the locking element from the locking position to the unlocking position by means of the magnetic interaction between the locking magnet and at least one unlocking magnet of a corresponding key unit, wherein the locking mechanism comprises at least two locking elements, and in that, the polarities of at least two of the locking magnets of different locking elements differ in relation to the unlocking direction of the respective locking element.

2. The swivel lever device according to claim 1, wherein at least two of the locking elements are arranged on opposing sides of one or both of the longitudinal axis of the swivel lever and/or of the longitudinal axis of the housing, and/or in that at least two of the locking elements are arranged spaced apart from one another along one or both of the longitudinal axis of the swivel lever and/or along the longitudinal axis of the housing.

3. The swivel lever device according to claim 1, wherein the locking element can be adjusted between the locking position and the unlocking position, in that the locking element is formed by the locking magnet.

4. The swivel lever device according to claim 1, wherein, in the latched position of the swivel lever, the locking element is received in one or both of the housing and the swivel lever in one or both of the locking position and/or unlocking position such that the locking element is inaccessible or not visible from the outside.

5. The swivel lever device according to claim 1, wherein the locking element is received in an unlocking receptacle of the swivel lever or of the housing in the unlocking position, in that, in the latched position of the swivel lever, the locking element engages in a positive-locking manner into a locking receptacle of the housing or of the swivel lever in the locking position.

6. The swivel lever device according to claim 1, wherein the locking mechanism comprises at least one securing element for automatically adjusting the at least one locking element from the unlocking position to the locking position when the swivel lever is adjusted to the latched position, and in that the securing element is fastened to either or both of the housing and to the swivel lever and/or is received at least partially in the housing or in the swivel lever.

7. The swivel lever device according to claim 6, wherein the at least one securing element is formed from a ferromagnetic material, and the locking element can be automatically adjusted from the unlocking position to the locking position by the magnetic interaction between the locking magnet and the securing element when the swivel lever is adjusted to the latched position.

8. The swivel lever device according to claim 1, wherein the locking mechanism comprises at least one retaining element to prevent the locking element from being unintentionally adjusted from the unlocking position to the locking position in the actuating position of the swivel lever, and in that the retaining element is designed to at least partially cover an opening of an unlocking receptacle for receiving the locking element in the unlocking position.

9. The swivel lever device according to claim 8, wherein the retaining element can be adjusted between a retaining position preventing the locking element from being unintentionally adjusted and a release position releasing the locking element for being adjusted, and in that the retaining element can be automatically adjusted from the retaining position to the release position when the swivel lever is adjusted from the actuating position to the latched position and/or the retaining element can be automatically adjusted from the release position to the retaining position when the swivel lever is adjusted from the latched position to the actuating position.

10. The swivel lever device according to claim 8, wherein the retaining element is designed as a rope, in particular wire rope, and/or in that the retaining element is held on one or both of the swivel lever and the housing by a spring.

11. A system for actuating a closure apparatus comprising one or both of a bolt closure means and/or bar closure means, of an access control device wherein the access control device comprises one or both of a door and/or hatch, having:

a swivel lever device, and a corresponding key unit, wherein the swivel lever device is designed according to claim 1 and in that the key unit has at least one unlocking magnet for adjusting the locking element from the locking position to the unlocking position by means of the magnetic interaction between the locking magnet and the unlocking magnet.

12. The system according to claim 11, wherein the key unit can be adjusted relative to the swivel lever and/or to the housing between a non-use position and a release position for unlocking the swivel lever device, and in that the key unit, in the release position, rests in a positive-locking manner on the swivel lever device in at least two, in particular three, directions perpendicular to one another.

13. The system according to claim 12, wherein the key unit, in the release position independently of the position of the swivel lever, is held in a positive-locking manner on the swivel lever in at least one pair of opposing directions and/or in that the swivel lever device, in particular the swivel lever, has at least one guide element for guided adjustment of the key unit between the non-use position and the release position.

14. The system according to claim 11, wherein the key unit is a master key unit, which has at least one master unlocking magnet for unlocking at least one further swivel lever device, differently from the master key unit in relation to the position of the locking elements.

15. The swivel device according to claim 3, wherein the locking element is designed in a pin-shaped manner.

16. The swivel lever device according to claim 10, wherein the housing is designed as a spring means.

* * * * *